United States Patent [19]

Hirano

[11] Patent Number: 5,291,111
[45] Date of Patent: Mar. 1, 1994

[54] DRIVE CONTROLLER AND DRIVE CONTROL METHOD FOR A STEPPING MOTOR WITHOUT A STEP OUT ERROR

[75] Inventor: Takahisa Hirano, Mishima, Japan

[73] Assignee: Tokyo Electric Co., Ltd., Tokyo, Japan

[21] Appl. No.: 886,716

[22] Filed: May 21, 1992

[30] Foreign Application Priority Data

May 28, 1991 [JP] Japan ................................ 3-123456

[51] Int. Cl.$^5$ .............................................. G05B 11/26
[52] U.S. Cl. ................................... 318/563; 318/597; 318/696; 318/101
[58] Field of Search ............... 318/597, 563, 518.17, 318/696, 54, 65, 101-104

[56] References Cited

U.S. PATENT DOCUMENTS

| 4,717,866 | 1/1988 | Gray ........................... 318/696 |
| 4,904,917 | 1/1990 | Hakluytt ...................... 318/696 |
| 5,059,883 | 10/1991 | Takahashi ..................... 318/696 |

FOREIGN PATENT DOCUMENTS

4-41280 2/1992 Japan.

*Primary Examiner*—William M. Shoop, Jr.
*Assistant Examiner*—Brian Sircus
*Attorney, Agent, or Firm*—Frishauf, Holtz, Goodman & Woodward

[57] ABSTRACT

A drive controller for a stepping motor having a plurality of excitation phases which designate stepping positions thereof, includes a motor driver for sequentially exciting the excitation phases to rotate the stepping motor in increments of one step angle, and a control section for controlling the motor driver to set an excitation interval. When the control section sets the excitation interval to be shorter than an interval of a stepping range in which the stepping motor temporarily stops for each increment, the stepping motor is driven in a slewing mode in which the rotation of the stepping motor is continued without stopping for each increment. The control section includes a position correcting section for controlling the driving section prior to driving of the stepping motor in the slewing mode to sequentially excite the excitation phases for all the stepping positions of the stepping motor at the interval of the stepping range, with the final excitation phase being set as an excitation phase corresponding to a stepping position from which the rotation of the stepping motor may be started in the slewing mode, without a possibility of step out occuring.

10 Claims, 4 Drawing Sheets

PRIOR ART

FIG. 5

PRIOR ART

DRIVE CONTROLLER AND DRIVE CONTROL METHOD FOR A STEPPING MOTOR WITHOUT A STEP OUT ERROR

BACKGROUND OF THE INVENTION

1. Field of the Invention

This invention relates to a drive controller and a drive control method for a stepping motor incorporated into a paper feeding mechanism of a printer.

2. Description of the Related Art

Figure 1:
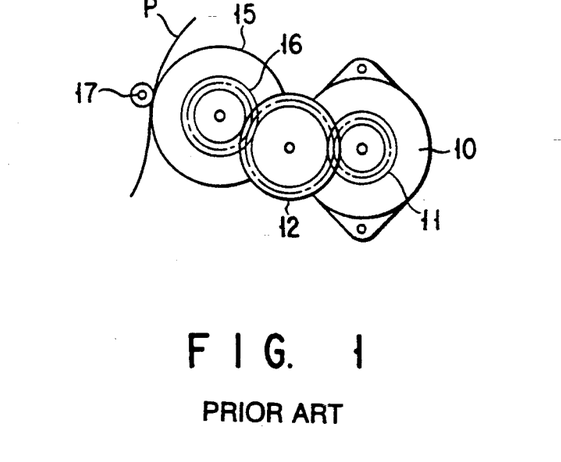
FIG. 1 is a view showing a paper feeding mechanism of a typical printer.
Figure 2:
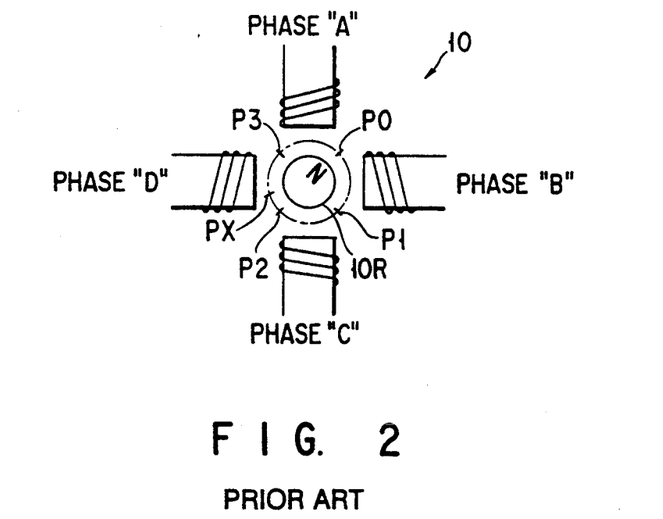
FIG. 2 is a view schematically showing the internal structure of a stepping motor incorporated in the paper feeding mechanism shown in FIG. 1.
Figure 3:
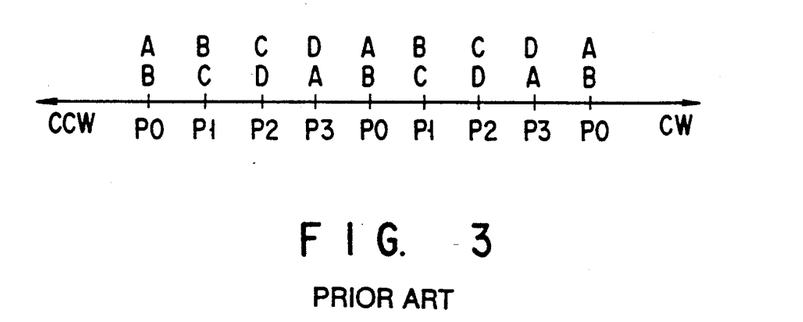
FIG. 3 is a diagram showing the rotation direction corresponding to the exciting order of the excitation phases of the stepping motor shown in FIG. 2.

FIG. 1 shows a paper feeding mechanism of a printer. The paper feeding mechanism includes a stepping motor 10 which can be rotated in both directions and a gear 11 rotated together with the stepping motor 10. Rotation of the gear 11 is transmitted to a gear 16 by means of an idler gear 12. Paper P is set between a feed roller 15 and a pressing roller 17 which presses the paper P against the feed roller 15, and the feed roller 15 is rotated together with the gear 16 to feed the paper P. For example, as shown in FIG. 2, the stepping motor 10 includes a plurality of excitation coils arranged to surround a rotor 10R. For brief explanation, four excitation coils A, B, C and D are shown in FIG. 2. The excitation coils A, B, C and D are excited on the basis of a two-phase excitation system, for example. In the two-phase excitation system, adjacent two of the excitation coils A, B, C and D are set into the excitation phase and excitation currents are simultaneously supplied to two excitation coils of each excitation phase. The rotor 10R rotates in a direction corresponding to the excitation order indicated as shown in FIG. 3. FIG. 3 shows a case wherein the rotor 10R is rotated from the starting position which is defined by the stepping position P0 which corresponds to the excitation phases A and B and at which the N pole thereof is initially set as shown in FIG. 2. That is, the rotor 10R is rotated in a clockwise direction when, the excitation phases are excited in an order of BC, CD, DA, AB, and so on, and is rotated in a counterclockwise direction when the excitation phases are excited in an order of DA, CD, BC, AB, and so on. The N pole of the rotor 10R is attracted towards the step position P0, P1, P2 or P3 when the excitation phase AB, BC, CD or DA is excited, respectively.

Figure 4:
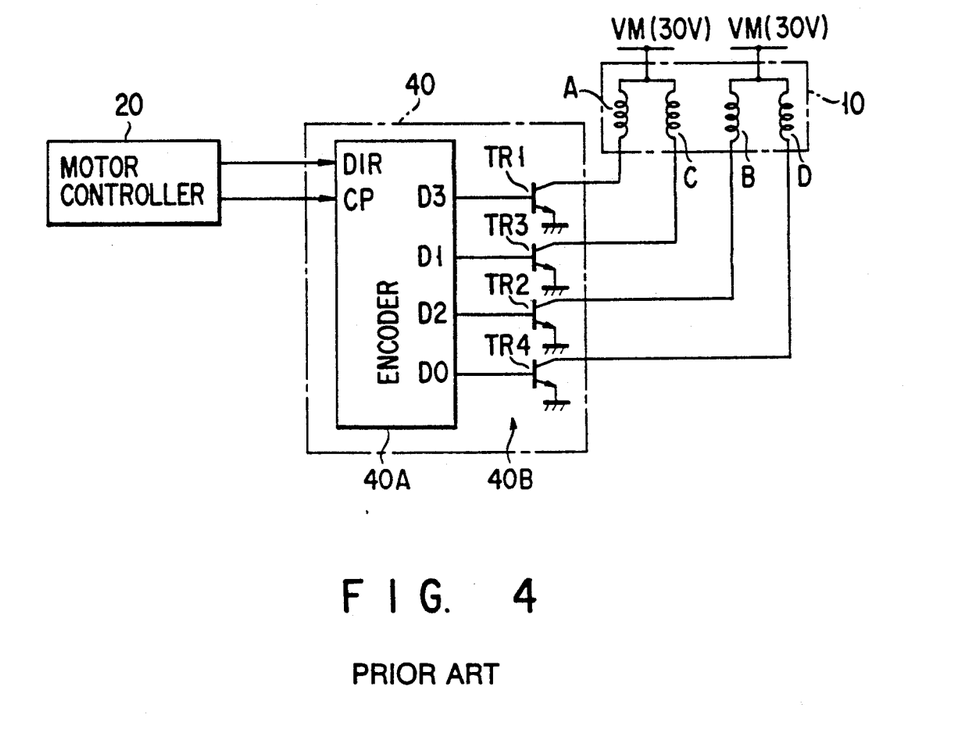
FIG. 4 is a block diagram schematically showing the construction of a conventional drive controller for the stepping motor shown in FIG. 2.

FIG. 4 shows the construction of a drive controller of the stepping motor 10 described above. The drive controller includes a control section 20 for setting the rotation amount, rotation direction, operation mode and the like of the stepping motor 10 and a motor driver 40 controlled by the motor control section 20 according to the setting data to selectively excite the excitation phases AB, BC, CD and DA of the stepping motor. The motor driver 40 includes an encoder 40A for generating 4-digit excitation phase signals allotted to the excitation coils A, B, C and D and an excitation switch 40B for selectively supplying an excitation current to the excitation coils A, B, C and D according to the excitation phase signal. The excitation phase signal is set to one of "1100", "0110", "0011" and "1001" and is used to selectively specify one of the excitation phases AB, BC, CD and DA. The encoder 40A generates the excitation phase signals in an order determined by the previously set rotation direction, by a number of times determined by the previously set rotation amount and at an interval determined by the previously set operation mode. The excitation switch 40B includes transistors T1 to T4 for selectively switching the excitation currents supplied from a power source VM to the excitation coils A, B, C and D. The transistors T1, T2, T3 and T4 are respectively turned on when the first, second, third and fourth digits of the excitation phase signal are "1" and respectively turned off when the first to fourth digits thereof are "0".

The stepping motor 10 has operation modes including a stepping mode in which it stops rotation for each increment of one step angle so as to be intermittently rotated and a slewing mode in which it is continuously rotated without being stopped for each increment of one step angle. The slewing mode is set when it is necessary to feed paper by a long distance in a short period of time, for example. In this case, the excitation interval is so controlled that the rotation speed of the stepping motor 10 will vary according to a pattern shown in FIG. 5. That is, the stepping motor 10 is accelerated from a stepping speed at which it can be stopped for each increment of one step angle to a desired speed, rotated at the desired speed, then decelerated to the stepping speed, and stopped.

Figure 5:
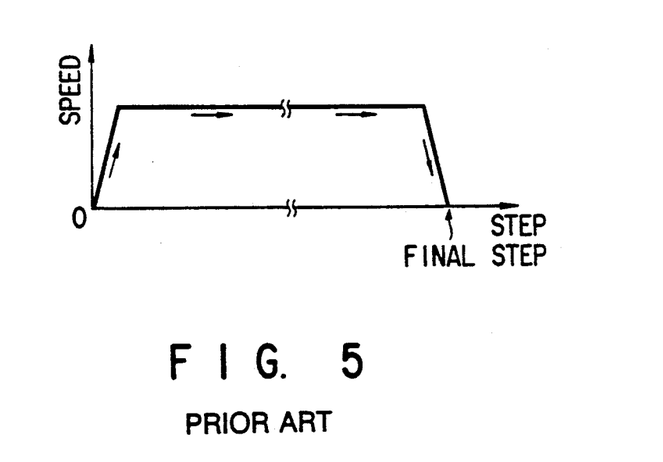
FIG. 5 is a graph showing a speed pattern set when the stepping motor shown in FIG. 2 is driven in the slewing mode.

The excitation interval must be set within a range in which the driver 40 can be electrically operated, but it can be set extremely short since the driver 40 does not effect the mechanical operation. However, in the stepping motor 10, the mechanical properties such as inertia and stepping angle are the main factors for determining the motor speed. The motor speed limits the range of the excitation interval when the rotation speed of the stepping motor 10 is changed. When the excitation interval exceeds the preset range, the rotor 10R cannot follow the switching of the excitation phases. Therefore, when the excitation interval is changed in the slewing mode, the amount of variation in the excitation interval is set so as to permit the rotor 10R to follow the switching of the excitation phases and attain the maximum acceleration.

The above-described conventional drive controller has a problem that an erroneous operation occurs when paper which has been printed is removed by manually rotating the feed roller 15. Assume now that the rotor 10R of the stepping motor 10 is set in the angular position P0 at the end of the printing operation. In this condition, if the feed roller 15 is manually rotated, the rotation of the roller may be transmitted to the rotor 10R of the stepping motor 10 to set the rotor 10R to a position such as a position PX which is deviated from the angular position P0. If the position of the rotor 10R is thus deviated, the stepping motor 10 cannot be operated in the slewing mode. That is, the drive controller is designed to drive the stepping motor 10 while determining a position corresponding to the excitation phase lastly excited in the preceding printing operation as the starting position before the paper is fed to make ready for the next printing operation. Therefore, the excitation phases BC, CD, DA, AB, and so on are sequentially excited at an interval according to the above-described speed changing pattern. The rotor 10R cannot follow the switching of the excitation phases, causing the stepping motor to be stepped out.

SUMMARY OF THE INVENTION

An object of this invention is to provide a drive controller for stepping motors which can prevent the step-out from occurring when the stepping motor is driven in the slewing mode.

Another object of the invention is to provide a drive control method for stepping motors which can prevent the step-out from occurring when the stepping motor is driven in the slewing mode.

The first object can be attained by a drive controller for a stepping motor having a plurality of excitation phases which designate stepping positions thereof, comprising: a driving section for sequentially exciting the excitation phases to rotate the stepping motor in increments of one step angle; and a control section for controlling the driving section to set the excitation interval shorter than an interval of a stepping range in which the stepping motor temporarily stops for each increment so as to drive the stepping motor in a slewing mode in which the rotation of the stepping motor is continued without stopping for each increment; the control section having a position correcting section for controlling the driving section prior to the driving of the stepping motor in the slewing mode to sequentially excite the excitation phases for all the stepping positions of the stepping motor at the interval of the stepping range, with the final excitation phase being set as an excitation phase corresponding to a stepping position from which the rotation of the stepping motor starts in the slewing mode.

The second object can be attained by a drive control method for a stepping motor having a plurality of excitation phases which designate stepping positions thereof and are sequentially excited to rotate the motor in increments of one step angle, comprising: a step of sequentially excitation the exciting phases at an excitation interval shorter than an interval of a stepping·range in which said stepping motor temporarily stops for each increment so as to drive said stepping motor in a slewing mode in which rotation of said stepping motor is continued without stopping for each increment; and a step of correcting the current stop position of the stepping motor prior to the step of driving the stepping motor in the slewing mode, by sequentially exciting the excitation phases for substantially all the stepping positions of said stepping motor at the excitation interval of the stepping range, with the final excitation phase being set as an excitation phase corresponding to a stepping position from which the rotation of said stepping motor starts in the slewing mode.

With the above controller and control method, the excitation phases for all of the stepping positions of the stepping motor are sequentially excited at the interval of the stepping range before the stepping motor is driven in the slewing mode. Thus, when the excitation interval lies within the stepping range, even if the stop position of the stepping motor is deviated from the starting position in the slewing mode, the stepping motor may follow the switching of the excitation phases immediately after the excitation phase near the deviated position is excited. In the switching operation of the excitation phases, the last excitation phase is set as the excitation phase corresponding to the starting position in the slewing mode. As a result, the stop position of the stepping motor can be corrected even if it is deviated before the stepping motor is driven in the slewing mode. Therefore, the stepping motor can be prevented from being stepped out when driven in the slewing mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

There will now be described a drive controller of a a stepping motor according to an embodiment of this invention with reference to FIGS. 6 to 8.

The drive controller is used to drive a stepping motor incorporated in the paper feed mechanism of the printer shown in FIG. 1.

Figure 6:
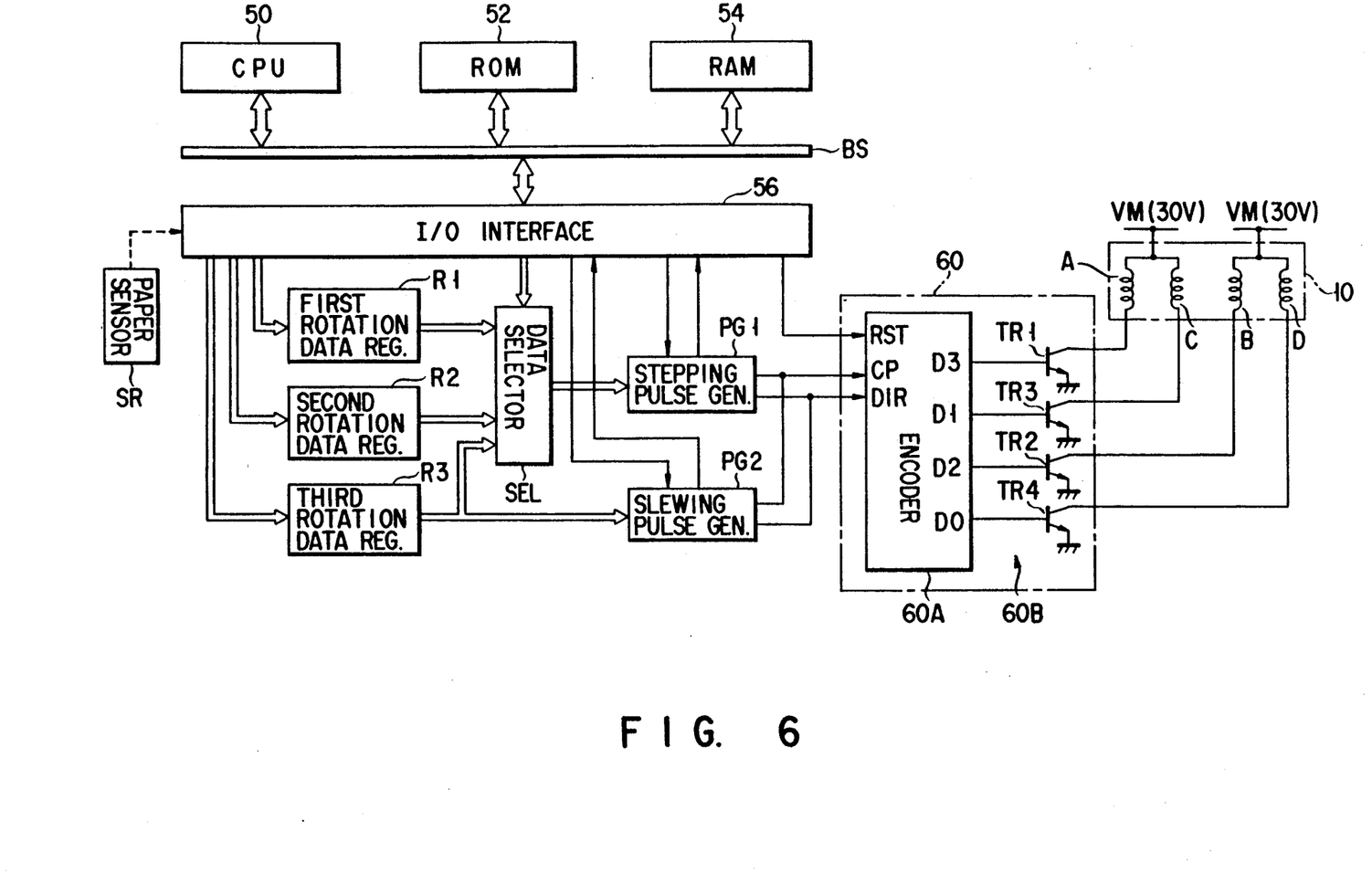
FIG. 6 is a block diagram showing the construction of a drive controller of a stepping motor according to one embodiment of this invention.

FIG. 6 shows the circuit construction of the drive controller. The drive controller includes a CPU 50, ROM 52, RAM 54 and I/O interface 56 connected to one another via a bus line BS to effect the paper feed control as part of the operation control of the printer. The CPU 50 effects various data processings necessary for the operation control of the printer. The ROM 52 stores control program data of the CPU 50 and fixed data such as data representing the total step number N necessary for the stepping motor 10 to make one revolution. The RAM 54 temporarily stores input/output data of the CPU 50. The I/O interface 56 is used to transfer a data signal between the CPU 50 and a peripheral circuit which will be described later.

The drive controller further includes first to third rotation data registers R1, R2 and R3 for storing rotation data supplied from the I/O interface 56, a data selector SEL for selecting one of the rotation data items stored in the registers R1 R2 and R3 according to a selection signal supplied from the I/O interface 56, a stepping pulse generator PG1 for generating pulses at an interval of the stepping range (= self-starting frequency) in which the stepping motor 10 temporarily stops for each increment of one step angle in response to an enable signal supplied from the I/O interface 56, a slewing pulse generator PG2 for generating pulses at an excitation interval shorter than the interval of the stepping range in response to an enable signal supplied from the I/O interface 56, and a motor driver 60 for driving the stepping motor 10 in response to output signals from the pulse generators P1 and P2. The stepping pulse generator PG1 is used to drive the stepping motor 10 in the stepping mode and the slewing pulse generator PG1 is used to drive the stepping motor 10 in the slewing mode.

The first rotation data register R1 stores rotation data for rotating the stepping motor 10 in a clockwise direction by steps of a number which is less than the total step number N by "1", the second rotation data register R2 stores rotation data for rotating the stepping motor 10 in a counterclockwise direction by steps of a number which is less than the total step number N by "1", and the third rotation data register R3 stores rotation data for rotating the stepping motor 10 in a clockwise or counterclockwise direction by a desired number of steps. In this embodiment, since the total step number N is 4, "+3" is stored in the register R1 and "−3" is stored in the register R2. In the data registers R1, R2 and R3, the rotation direction of the stepping motor is indicated by a sign of the rotation data.

The stepping pulse generator PG1 receives rotation data from the data selector SEL, generates pulses of a number equal to the step number specified by the received rotation data and continuously generates a direction signal indicating the direction specified by the received rotation data. The slewing pulse generator PG2 receives rotation data from the data register R3, generates pulses of a number equal to the step number specified by the received rotation data and continuously generates a direction signal indicating the direction specified by the received rotation data. Further, each of the pulse generators PG1 and PG2 supplies a completion signal to the I/O interface 56 after generating all of the specified number of pulses.

The motor driver 60 is substantially the same as that shown in FIG. 4 and selectively excites the excitation phases AB, BC, CD and DA of the stepping motor 10. The motor driver 60 includes an encoder 60A for generating 4-digit excitation phase signals allotted to the excitation coils A, B, C and D and an excitation switch 60B for selectively permitting an excitation current to be supplied to the excitation coils A, B, C and D according to the excitation phase signal. The excitation phase signal is selectively set to one of "1100", "0110", "0011" and "1001" and is used to selectively specify one of the excitation phases AB, BC, CD and DA. The encoder 60A generates the excitation phase signals of number determined by the number of pulses supplied from the pulse generator PG1 or PG2 in an order determined by the direction signal from the pulse generator PG1 or PG2 at an interval equal to the interval of the pulses generated from the pulse generator PG1 or PG2. The encoder 60A switches the excitation phase signals in an order corresponding to the direction signal in response to a pulse supplied from the pulse generator PG1 or PG2 and outputs the same to the excitation switch 60B. The excitation switch 60B includes transistors TR1 to TR4 for switching the excitation currents supplied from the power source VM to the respective excitation coils A, B, C, and D. The transistors T1, T2, T3 and T4 are respectively turned on when the first, second, third and fourth digits of the excitation phase signal are "1" and respectively turned off when the first to fourth digits thereof are "0".

For example, when the stepping motor is rotated in a clockwise direction from the stepping position P0, the encoder 60A generates the excitation signals in an order of "0110", "0011", "1001", "1100", and so on, and the excitation switch 60B permits the excitation current to be sequentially supplied to the excitation phases BC, CD, DA, AB, and so on. Further, for example, when the stepping motor is rotated in a counterclockwise direction from the stepping position P0, the encoder 60A generates the excitation signals in an order of 1001", "0011", "0110", "1100", and so on and the excitation switch 60B permits the excitation current to be sequentially supplied to the excitation phases DA, CD, BC, AB, and so on. In this case, the encoder 60A holds the excitation phase signal output to the excitation switch 60B until a next pulse is supplied. For example, if the excitation phase signal "1100" is output in response to a final pulse for paper feeding, the excitation phase signal is held by the encoder 60A. Therefore, in the next paper feeding operation, rotation of the stepping motor 10 is started from the position P0 corresponding to the excitation phase AB excited by the excitation phase signal "1100". Further, the encoder 60A is designed to be reset and output a preset excitation phase signal "1100" when a reset signal is supplied via the I/O interface 56 after turning on the power source switch, for example.

Next, the operation of the above drive controller is explained.

When the power source switch of the drive controller is turned on, the CPU 50 reads out the control program stored in the ROM 52 and executes the program to effect the control operation for the printer The circuit components of the drive controller are initialized immediately after the operation control of the printer is started. In the initializing process, the CPU 50 previously sets "+3" and "−3" into the first and second rotation data registers R1 and R2.

For example, when it is required to feed paper by a short distance in the operation control of the printer, the stepping motor 10 is driven in the stepping mode. In the driving process, the CPU 50 sets rotation data indicating the rotation direction and a number of steps of the stepping motor 10 into the third rotation data register R3, supplies a selection signal for selecting the rotation data stored in the register R3 to the data selector SEL, and supplies an enable signal to the stepping pulse generator PG1. The pulse generator PG1 generates a direction signal indicating the rotation direction and pulses of a number specified by the rotation data supplied from the register R3 via the data selector SEL. The encoder 60A supplies excitation phase signals which are switched in an order corresponding to the direction signal in response to the pulses from the pulse generator PG1 to the excitation switch 60B. The excitation switch 60B supplies an excitation current to a corresponding excitation phase. As a result, the stepping motor 10 is rotated in a clockwise or counterclockwise direction in the stepping mode. The pulse generator PG1 generates a completion signal after generating all of the pulses of specified number and supplies the completion signal to the CPU 50 via the I/O interface 56. The CPU 50 determines completion of the paper feeding operation based on the completion signal.

If it is required to feed paper by a long distance in the operation control of the printer, the stepping motor 10 is driven in the slewing mode. FIG. 7 shows a process flow for rotating the stepping motor 10 in a counterclockwise direction in the slewing mode and FIG. 8 shows a process flow for rotating the stepping motor 10 in a clockwise direction in the slewing mode.

Figure 7:
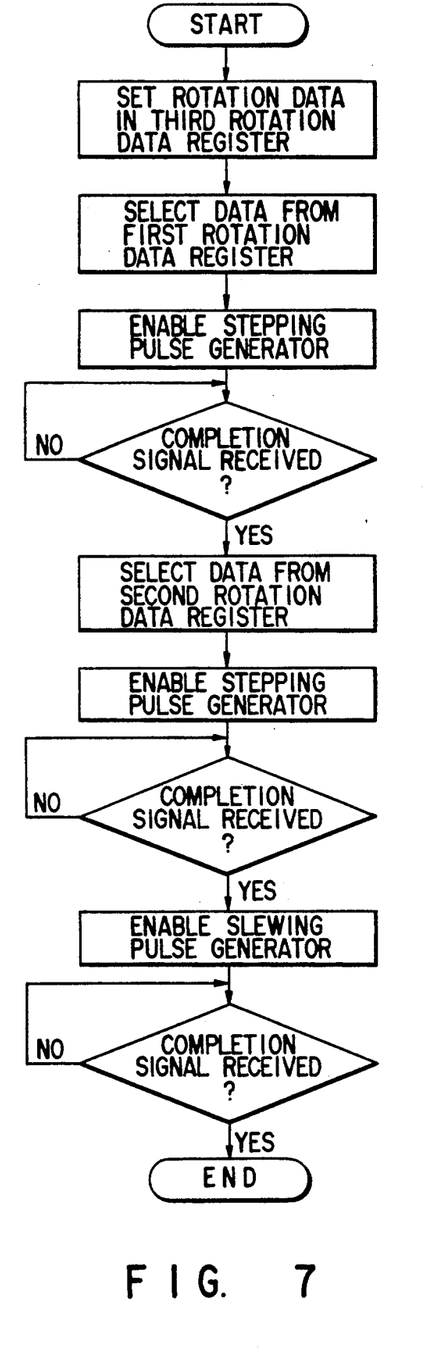
FIG. 7 is a flowchart for illustrating the operation effected when the drive controller shown in FIG. 6 rotates the stepping motor in the counterclockwise direction in the slewing mode.

When the process shown in FIG. 7 is started, the CPU 50 stores rotation data indicating the rotation direction (counterclockwise direction) and the number of steps of the stepping motor 10 into the third rotation data register R3, supplies a selection signal for selecting the rotation data stored in the register R1 to the data selector SEL, and supplies an enable signal to the stepping pulse generator PG1. The pulse generator PG1 generates a direction signal of clockwise direction and three pulses specified by the rotation data "+3" supplied from the register R1 via the data selector SEL. Assume now that an excitation phase signal "1100" is held in the encoder 60A. In this case, the encoder 60A sequentially supplies excitation phase signals "0110", "0011" and "1001" to the excitation switch 60B in response to the three pulses from the pulse generator PG1, and the excitation switch 60B permits excitation currents to be sequentially supplied to the excitation phases BC, CD and DA. As a result, the stepping motor 10 is rotated in the clockwise direction in the stepping mode. The stepping pulse generator PG1 generates a completion signal after generating the three pulses and supplies the same to the CPU 50 via the I/O interface 56. The CPU 50 supplies a selection signal for selecting the rotation data stored in the rotation data register R2 to the data selector SEL in response to the completion signal and supplies an enable signal again to the stepping pulse generator PG1. The pulse generator PG1 generates a direction signal of counterclockwise direction and three pulses specified by the rotation data "−3" supplied from the register R2 via the data selector SEL. Then, the encoder 60A sequentially supplies excitation phase signals "0011", "0110" and "1100" to the excitation switch 60B in response to the three pulses from the pulse generator PG1, and the excitation switch 60B permits excitation currents to be sequentially supplied to the excitation phases CD, BC and AB. As a result, the stepping motor 10 is rotated in the counterclockwise direction in the stepping mode. The stepping pulse generator PG1 generates a completion signal again after generating the three pulses and supplies the same to the CPU 50 via the I/0 interface 56. The CPU 50 supplies an enable signal to the slewing pulse generator PG2 in response to the completion signal. The pulse generator PG2 generates a direction signal of counterclockwise direction and pulses of a number specified by the rotation data directly supplied from the register R3. The encoder 60A sequentially supplies excitation phase signals "1001", "0011", "0110", "1100", and so on to the excitation switch 60B in response to the pulses from the pulse generator PG2, and the excitation switch 60B permits excitation currents to be sequentially supplied to the excitation phases DA, CD, BC, AB, and so on. As a result, the stepping motor 10 is rotated in the counterclockwise direction in the slewing mode. The stepping pulse generator PG2 generates a completion signal after generating all of the pulses and supplies the same to the CPU 50 via the I/0 interface 56. The CPU 50 determines completion of the paper feeding operation based on the completion signal.

Figure 8:
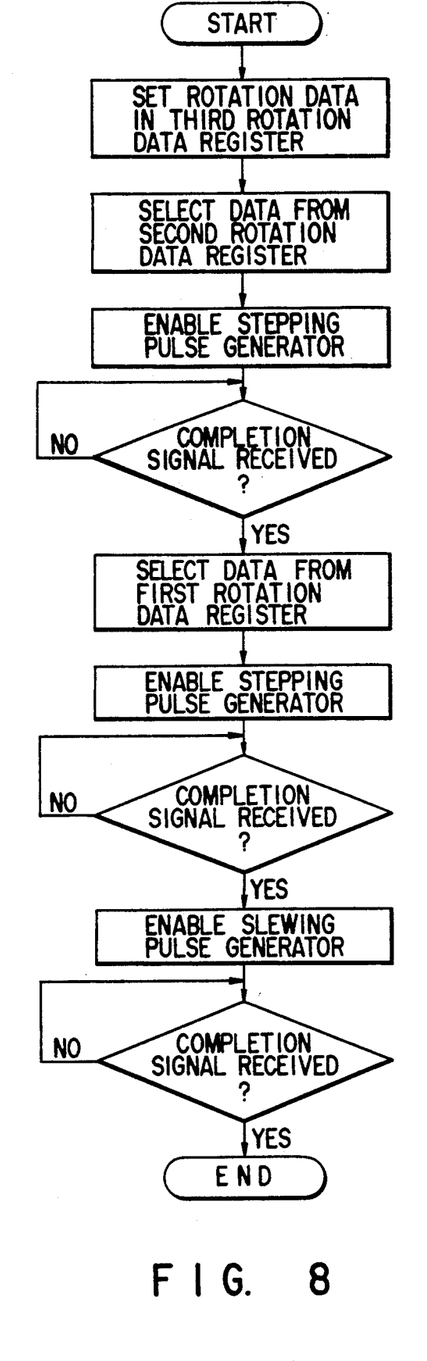
FIG. 8 is a flowchart for illustrating the operation effected when the drive controller shown in FIG. 6 rotates the stepping motor in the clockwise direction in the slewing mode.

When the process shown in FIG. 8 is started, the CPU 50 stores rotation data indicating the rotation direction (clockwise direction) and the number of steps of the stepping motor 10 into the third rotation data register R3, supplies a selection signal for selecting the rotation data stored in the rotation data register R2 to the data selector SEL, and supplies an enable signal to the stepping pulse generator PG1. The pulse generator PG1 generates a direction signal of counterclockwise direction and three pulses specified by the rotation data "−3" supplied from the register R2 via the data selector SEL. Assume now that an excitation phase signal "1100" is held in the encoder 60A. In this case, the encoder 60A sequentially supplies excitation phase signals "1001", "0011" and "0110" to the excitation switch 60B in response to the three pulses from the pulse generator PG1, and the excitation switch 60B permits excitation currents to be sequentially supplied to the excitation phases DA, CD and BC. As a result, the stepping motor 10 is rotated in the counterclockwise direction in the stepping mode The stepping pulse generator PG1 generates a completion signal after generating the three pulses and supplies the same to the CPU 50 via the I/0 interface 56. The CPU 50 supplies a selection signal for selecting the rotation data stored in the rotation data register R1 to the data selector SEL in response to the completion signal and supplies an enable signal again to the stepping pulse generator PG1. The pulse generator PG1 generates a direction signal of clockwise direction and three pulses specified by the rotation data "+3" supplied from the register R1 via the data selector SEL. Then, the encoder 60A sequentially supplies excitation phase signals "0011", "1001" and "1100" to the excitation switch 60B in response to the three pulses from the pulse generator PG1, and the excitation switch 60B permits excitation currents to be sequentially supplied to the excitation phases CD, DA and AB. As a result, the stepping motor 10 is rotated in the clockwise direction in the stepping mode. The stepping pulse generator PG1 generates a completion signal again after generating the three pulses and supplies the same to the CPU 50 via the I/0 interface 56. The CPU 50 supplies an enable signal to the slewing pulse generator PG2 in response to the completion signal. The pulse generator PG2 generates a direction signal of clockwise direction and pulses of a number specified by the rotation data directly supplied from the register R3. The encoder 60A sequentially supplies excitation phase signals "0110", "0011", "1001", "1100" , and so on to the excitation switch 60B in response to the pulses from the pulse generator PG2, and the excitation switch 60B permits excitation currents to be sequentially supplied to the excitation phases BC, CD, DA, AB, and so on. As a result, the stepping motor 10 is rotated in the clockwise direction in the slewing mode. The stepping pulse generator PG2 generates a completion signal after generating all of the specified number of pulses and supplies the same to the CPU 50 via the I/O interface 56. The CPU 50 determines completion of the paper feeding operation based on the completion signal.

With the above drive controller, the excitation phases AB, BC, CD and DA for all of the stepping positions P0, P1, P2 and P3 are sequentially excited at an interval of the stepping range before the stepping motor 10 is driven in the slewing mode. If the excitation interval is thus set within the stepping range, then even when the stop position of the stepping motor 10 is deviated from the starting position in the slewing mode, the stepping motor 10 may follow the switching of the excitation phases after the excitation phase near the deviated position is excited. In the switching operation of the excitation phases, the last excitation phase is set as an excitation phase corresponding to the starting position in the slewing mode. As a result, the stop position of the stepping motor can be corrected even if it is deviated before the the stepping motor is driven in the slewing mode. Therefore, the stepping motor can be prevented from being stepped out when driven in the slewing mode.

Further, in this embodiment, the direction in which the stepping motor 10 is rotated in the slewing mode is set to coincide with that set immediately before correction of the stop position of the stepping motor 10 is completed. Therefore, backlash of the gears 11, 12 and 16 driven by the stepping motor 10 can be prevented.

In the above embodiment, in the operation of correcting the stop position before the stepping motor 10 is driven in the slewing mode, the stepping motor 10 is rotated in clockwise and counterclockwise directions. However, when the stop position of the stepping motor 10 is corrected with paper removed from the paper feeding mechanism, there is no possibility that the printing starting position of the paper is deviated. Therefore, it is possible to rotate the stepping motor in only one of the clockwise and counterclockwise directions by using a paper sensor shown in FIG. 6, for example, and causing the CPU 50 to detect that the paper is removed from the paper feeding mechanism based on an output signal from the sensor. At this time, it is preferable to determine the rotation direction of the stepping motor by taking the backlash of the gears 11, 12 and 16 into consideration.

Further, in this embodiment, rotation data is set into the rotation data registers R1 and R2 by means of the CPU 50. However, since the total step number N of the stepping motor 10 is fixed, a data generation circuit for generating rotation data "+(N−1)" and "−(N−1)" may be used. Further, it is possible to supply the rotation direction signal from the CPU 50 to the encoder 60A via the I/0 interface 56.

In the above embodiment, it is preferable to excite all of the excitation phases with the final excitation phase set as an excitation phase which corresponds to the starting position in the slewing mode. If the final excitation phase is set as an excitation phase which corresponds to the starting position in the slewing mode, the possibility of step-out can be made lower without exciting all of the excitation phases in comparison with a case wherein the stop position is not corrected.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A drive controller for a stepping motor having a plurality of excitation phases which designate corresponding stepping positions, said drive controller comprising:

driving means for sequentially exciting the excitation phases of said stepping motor to rotate said stepping motor in increments of one step between corresponding stepping positions thereof; and control means for controlling said driving means to set an excitation interval at which the excitation phases are sequentially excited, said stepping motor being driven in a stepping mode, in which rotation of said stepping motor temporarily stops at each stepping position after each incremental rotation of one step, when said excitation interval is set in a stepping range, and said stepping motor being driven in a slewing mode, in which rotation of said stepping motor is continued without stopping at each stepping position after each incremental rotation of one step, when said excitation interval is set shorter than the stepping range;

wherein said control means includes position correcting means for controlling said driving means, prior to a driving of said stepping motor in said slewing mode, to sequentially excite a predetermined number of excitation phases to drive said stepping motor in said stepping mode, with a final excitation phase being set as an excitation phase corresponding to a stepping position from which rotation of said stepping motor starts in said slewing mode.

2. A drive controller according to claim 1, wherein said position correcting means includes rotation direction controlling means for controlling said driving means, prior to the driving of said stepping motor in said slewing mode, to sequentially rotate said stepping motor by a same number of steps in a clockwise and a counterclockwise direction.

3. A drive controller according to claim 2, wherein said rotation direction controlling means includes order setting means for setting an order of rotation in the clockwise and counterclockwise directions, such that the driving means rotates said stepping motor in a direction opposite to a predetermined direction of rotation in said slewing mode, and then rotates said stepping motor in a direction coincident with the predetermined direction of rotation in said slewing mode.

4. A drive controller according to claim 1, wherein said position correcting means includes rotation direction controlling means for controlling said driving means, prior to the driving of said stepping motor in said slewing mode, to rotate said stepping motor in one of a clockwise and counterclockwise direction.

5. A drive controller according to claim 4, wherein said rotation direction controlling means includes setting means for setting a rotation direction of said stepping motor to coincide with a predetermined direction of rotation of said stepping motor in said slewing mode.

6. A drive controller according to claim 2, wherein said rotation direction controlling means includes:

first rotation data generating means for generating data representing a number of steps of rotation in the clockwise direction;

second rotation data generating means for generating data representing the same number of steps of rotation in the counterclockwise direction;

rotation data selection means for sequentially selecting data items generated by said first and second rotation data generating means; and stepping pulse generating means for generating, at an excitation interval in the stepping range, excitation pulses corresponding to the data selected by said rotation data selection means.

7. A drive controller according to claim 6, wherein said driving means includes encoding means for switching the excitation phases in response to the excitation pulses generated by said stepping pulse generating means.

8. A drive controller for a stepping motor having a plurality of excitation phases which designate corresponding stepping positions, said drive controller being incorporated in a paper feed device and comprising:

driving means for sequentially exciting the excitation phases of said stepping motor to rotate said stepping motor in increments of one step between the corresponding stepping positions thereof; and control means for controlling said driving means to set an excitation interval at which the excitation phases are sequentially excited, said stepping motor being driven in a stepping mode, in which rotation of said stepping motor temporarily stops at each stepping position after each incremental rotation of one step, when said excitation interval is set in a stepping range, and said stepping motor being driven in a slewing mode, in which rotation of said stepping motor is continued without stopping at each stepping position after each incremental rotation of one step, when said excitation interval is set shorter than the stepping range;

wherein said control means includes position correcting means for controlling said driving means, prior to a driving of said stepping motor in said slewing mode, to sequentially excite a predetermined number of excitation phases to drive said stepping motor in said stepping mode, with a final excitation phase being set as an excitation phase corresponding to a stepping position from which rotation of said stepping motor starts in said slewing mode; and wherein said position correcting means includes rotation direction controlling means for controlling said driving means, prior to the driving of said stepping motor in said slewing mode, to sequentially rotate said stepping motor by a same number of steps in a clockwise and a counterclockwise direction, said rotation direction controlling means including limiting means for limiting rotation of said stepping motor, prior to the driving of said stepping motor in said slewing mode, to only one of the clockwise and counterclockwise directions when paper is removed from the paper feed device.

9. A drive controller according to claim 8, wherein said limiting means includes a paper sensor for detecting that paper is removed from the paper feed device.

10. A drive control method for driving a stepping motor having a plurality of excitation phases which designate corresponding stepping positions and which are sequentially excited to rotate said stepping motor in increments of one step between the corresponding stepping positions thereof, said drive control method comprising:

sequentially exciting the excitation phases of said stepping motor to drive said stepping motor in a stepping mode, in which rotation of said stepping motor temporarily stops at each stepping position after each incremental rotation of one step, when an excitation interval is set in a stepping range, and sequentially exciting the excitation phases of said stepping motor to drive said stepping motor in a slewing mode, in which rotation of said stepping motor is continued without stopping at each stepping position after each incremental rotation of one step, when said excitation interval is set shorter than the stepping range; and correcting a stepping position of said stepping motor, prior to a driving of said stepping motor in said slewing mode, by sequentially exciting a predetermined number of excitation phases to drive said stepping motor in said stepping mode, with a final excitation phase being set as an excitation phase corresponding to a stepping position from which rotation of said stepping motor starts in said slewing mode.

* * * * *